United States Patent Office 3,506,684
Patented Apr. 14, 1970

3,506,684
NEW N-BENZO[B]THIEN-3-YLANTHRANILIC ACID COMPOUNDS
Robert A. Scherrer, White Bear Lake, Minn., assignor to Parke, Davis & Company, Detroit, Mich., a corporation of Michigan
No Drawing. Filed Apr. 6, 1967, Ser. No. 628,825
Int. Cl. C07d 63/22
U.S. Cl. 260—330.5                     5 Claims

ABSTRACT OF THE DISCLOSURE

N-[2-methyl(and 2-chloro- and 2-bromo-)benzo[B]-thien-3-yl]anthranilic acids, esters, and salts thereof, which are useful as pharmacological agents having anti-inflammatory activity, and their production by (a) reaction of anthranilic acid, or a lower alkyl ester thereof, or a carboxylate salt thereof with a 3-halo-2-methylthianaphthene compound; (b) reaction of N-(benzo[B]thien-3-yl)anthranilic acid with a halogenating agent; and (c) esterification of an N-[2-methyl(or 2chloro- or 2-bromo-)benzo[B]thien-3-yl]anthranilic acid or an alkali metal salt thereof.

SUMMARY AND DETAILED DESCRIPTION

The present invention relates to new N-benzo[B]-thien-3-ylanthranilic acids and to salts and esters thereof that are useful as pharmacological agents, and to methods for their production. More particularly, the invention relates to compounds having the formula

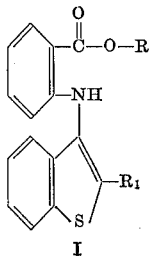

I and to pharmaceutically-acceptable salts thereof; where R represents hydrogen, a lower alkyl radical, or an aminoalkyl radical; and $R_1$ represents methyl, chlorine, or bromine. The aminoalkyl radical can be present in free base or acid-addition salt form.

In the foregoing formula the lower alkyl radicals are preferably those containing not more than four carbon atoms. The aminoalkyl radical can be represented by the formula

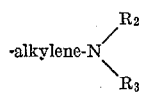

wherein the alkylene group contains not more than four carbon atoms, separating the groups to which it is attached by at least two carbon atoms, and each of $R_2$ and $R_3$ is a lower alkyl radical having not more than four carbon atoms, or $R_2$ and $R_3$ are combined and together with the nitrogen atom to which they are attached represent a heterocyclic amino radical such as pyrrolidino, piperidino, or morpholino.

In accordance with the invention, N-benzo[B]thien-3-ylanthranilic acid compounds having the formula

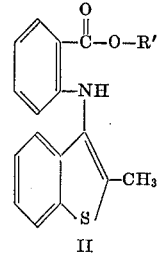

II are produced by reacting an anthranilic acid derivative having the formula

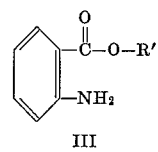

III with a 3-halo-2-methylthianaphthene compound having the formula

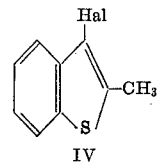

IV where R' represents hydrogen, lower alkyl, or a salt-forming cation, preferably an alkali metal cation; and Hal represents halogen, preferably bromine. The reaction is preferably carried out in the presence of a copper-containing catalyst, such as cupric bromide or cupric acetate, and a proton acceptor. In carrying out the reaction, it is generally satisfactory to employ substantially equivalent quantities of the reactants in the presence of a suitable solvent. Some examples of such solvents are N,N-dimethylformamide, N,N-dimethylacetamide, diethylene glycol dimethylether, dimethyl sulfoxide, nitrobenzene, higher boiling hydrocarbons, and lower aliphatic alcohols, such as isopropyl alcohol, n-butyl alcohol, amyl alchol, isoamyl alchol, and the like. A preferred solvent is N,N-dimethylformamide. The temperature and duration of the reaction may be varied over a wide range; a temperature in the range of 75–250° C. and a period of from 4 to 72 hours are satisfactorily employed.

The quantity of the proton acceptor employed in the reaction can be varied within wide limits. In general, sufficient should be used to bind the anthranilic acid reactant and the hydrohalic acid formed in the course of the reaction. Some of the proton acceptors which can be used when the anthranilic acid derivative is employed in free acid form are alkali metal carbonates, preferably potassium carbonate; cupric carbonate; cuprous carbonate and the like. When an alkali metal salt, preferably the potassium salt, of the anthranilic acid reactant is employed, the following substances can be used as the proton acceptor: calcium hydride, alkali metal carbonates, such as, e.g., potassium carbonate, and tertiary organic amines such as N-ethylmorpholine.

The anthranilic acid reactant is advantageously added to the reaction mixture in the form of its preformed alkali metal salt, preferably the potassium salt. Alternatively, the potassium salt of the anthranilic acid reactant can be conveniently prepared in situ in a very finely divided condition by adding potassium carbonate to a boiling solution of anthranilic acid in the solvent employed in the reaction. In the latter case, it is often advantageous to remove most of the water formed in the neutralization by distilling some of the solvent prior to the addition of the catalyst and other reactant.

Also in accordance with the invention, N-2-halobenzo[B]thien-3-ylanthranilic acids having the formula

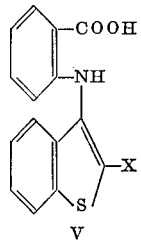

V are produced by reacting N-(benzo[B]thien-3-yl)anthranilic acid with a halogenating agent in an unreactive solvent medium; where X is chlorine or bromine. Halogenating agents that may be employed are bromine or N-bromosuccinimide for bromination and chlorine or sulfuryl chloride for chlorination. Suitable unreactive solvents that may be used include dioxane, tetrahydrofuran, carbon tetrachloride, chloroform, tetrachloroethane, nitrobenzene, and acetic acid. Preferred solvents are acetic acid and chloroform. The temperature and duration of the reaction are not critical and may be varied over a wide range. With chlorine or bromine as the halogenating agent, the reaction can readily be carried out at a temperature between 0 and 40° C. With the other halogenating agents, the reaction is most conveniently carried out at the reflux temperature of the reaction mixture. In all cases, the reaction is completed during a period of from 30 minutes to several hours. Approximately equivalent quantities of reactants are normally employed, although a slight excess of the halogenating agent is not harmful.

The N-(benzo[B]thien-3-yl)anthranilic acid starting material used above is prepared by reacting potassium anthranilate with 3-bromothianaphthene in the presence of cupric bromide and N-ethylmorpholine in N,N-dimethylformamide.

The lower alkyl N-benzo[B]thien-3-ylanthranilate compounds of the invention having the formula

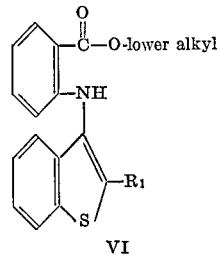

VI are produced by reacting an N-benzo[B]thien-3-ylanthranilic acid having the formula

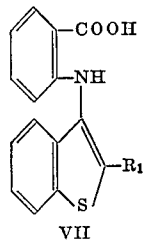

VII or a reactive derivative thereof with an esterifying agent; where $R_1$ is as defined previously. Examples of suitable reactive derivatives are the acid anhydrides, acid halides, and alkali metal salts of the acid. Some examples of suitable esterifying agents are lower alkanols, such as methanol and ethanol, esters of lower alkanols, such as methyl bromide, methyl iodide, ethyl iodide, and dimethyl sulfate, and diazomethane.

When the esterifying agent is a lower alkanol, the process is preferably carried out by heating the free acid in an excess of the lower alkanol in the presence of an acidic catalyst, such as hydrogen chloride, sulfuric acid, or benzenesulfonic acid. Additional solvents such as tetrahydrofuran, dioxane or diethylene glycol dimethyl ether may be present but are not necessary. The reaction is commonly carried out at a temperature in excess of 25° C., preferably at 60–150° C., but not higher than the reflux temperature, and is normally completed within 5 to 100 hours.

When the esterifying agent is an ester of a lower alkanol as described above, the process is preferably carried out by heating the anthranilic acid or salt thereof with the selected alkyl halide, dialkyl sulfate, or other alkyl ester derivative in a solvent in the presence of a base. Some examples of suitable solvents are lower alkanols, tetrahydrofuran, dioxane, dimethylformamide, diethylene glycol dimethyl ether, and mixtures thereof. Some examples of suitable bases are alkali metal hydroxides and carbonates, alkaline earth metal hydroxides, alkali metal alkoxides, and, in non-hydroxylic solvents, alkali metal hydrides. Approximately equivalent quantities of the anthranilic acid compound and the esterifying agent are normally employed. The reaction is usually carried out at a temperature from 25 to 150° C., preferably from 50 to 100° C., and under these conditions it is substantially complete within 24 hours.

When the esterifying agent is diazomethane, the process is preferably carried out in an unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

The acid halides of the N-benzo[B]thien-3-ylanthranilic acids of Formula VII required as starting materials are prepared by reacting the free acids with a halogenating agent. The alkali metal salts are prepared by reacting the free acids with an alkali metal hydroxide. The acid anhydrides are prepared by reacting an alkali metal salt of the free acid with the acid chloride.

The aminoalkyl N-benzo[B]thien-3-ylanthranilate compounds of the invention having the formula

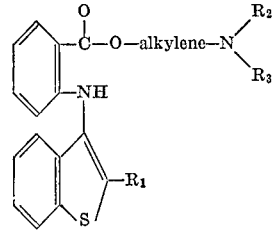

VIII and acid-addition salts thereof are produced by reacting an N-benzo[B]thien-3-ylanthranilic acid having Formula VII above, or an alkali metal salt thereof, with an aminoalkyl halide compound having the formula

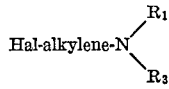

where Hal is a halogen atom, preferably chlorine or bromine, and $R_1$, $R_2$, $R_3$ and "alkylene" are as defined earlier. The aminoalkyl halide is preferably utilized in the form of the corresponding hydrohalide salt. For reasons of economy the reaction is usually carried out in the presence of one or more equivalents of a substance having a greater base strength than the aminoalkyl halide. Some examples of suitable basic compounds are tertiary amines, such as triethylamine and N-ethylpiperidine, and inorganic bases such as the alkali metal carbonates, alkali metal bicarbonates, alkaline earth metal carbonates, and alkaline earth metal oxides. The reaction is carried out under substantially anhydrous conditions in an inert organic solvent such as N,N-dimethylformamide, benzene, xylene, and toluene. Usually, the N-benzo[B]thien-3-ylanthranilic acid and the aminoalkyl halide are used in approximately equivalent quantities. When the free N-benzo[B]thien-3-ylanthranilic acid and the free base aminoalkyl halide are so used, approximately one equivalent of a basic compound is employed and the desired aminoalkyl ester is obtained in the reaction mixture as the free base. Alternatively, when a hydrohalide salt of the aminoalkyl halide is employed, approximately two equivalents of the basic compound are preferably used and the aminoalkyl ester is again obtained as the free base. The temperature of the reaction is not critical and may be varied from about 50 to 125° C. The preferred reaction temperature is in the neighborhood of 100° C., that is, between about 85 and 110° C.

The aminoalkyl N-benzo[B]thien-3-ylanthranilate compounds can be isolated in the foregoing procedures either as the free base or as an acid-addition salt, by appropriate adjustment of the pH.

The free acids and the free bases of the invention form salts with a variety of organic or inorganic bases or acids. Some examples of suitable bases are sodium hydroxide, potassium hydroxide, calcium hydroxide, aluminum hydroxide, sodium carbonate, potassium bicarbonate, choline, 2-hydroxyethylamine, ammonia, and diethylamine. Some examples of suitable acids are hydrochloric acid, hydrobromic acid, sulfuric acid, phosphoric acid, acetic acid, citric acid, tartaric acid, and sulfamic acid. The preferred carboxylate salts of the invention are the pharmaceutically-acceptable salts of an alkali metal, an alkaline earth metal, ammonia, or a substituted ammonia. Preferred acid- addition salts of the invention are the mineral acid salts. The carboxylate salts and acid-addition salts with pharmaceutically-acceptable cations and anions differ in solubility properties from the free acids and free bases but are otherwise equivalent for purposes of the invention.

The compounds of the invention are new chemical compounds that are useful as pharmacological agents. They are anti-inflammatory agents that can be used in the relief of inflammatory conditions as well as in the prevention or suppression of the occurrence of inflammation. They are preferably administered by the oral route although parenteral administration can also be used. The compounds of the invention can be employed in either free acid, ester, or salt form, and can be combined with either a solid or liquid carrier or diluent and made available in varying amounts in such pharmaceutical forms as tablets, capsules, powders, and aqueous and nonaqueous suspensions and solutions.

The invention is illustrated by the following examples.

EXAMPE 1

A mixture consisting of 55.5 g. of potassium anthranilate, 60 g. of 3-bromo-2-methylthianaphthene, 5.1 g. of cupric acetate, 6.1 ml. of N-ethylmorpholine, and 150 ml. of N,N-dimethylformamide is stirred and heated under reflux for two hours. The reaction mixture is made alkaline with 5% aqueous sodium hydroxide, and the alkaline mixture is warmed on a steam bath and filtered while warm. The filtrate is acidified with dilute hydrochloric acid, and N-(2-methylbenzo[B]thien-3-yl)anthranilic acid that precipitates is isolated, dried, and crystallized, first from aqueous ethanol, then from aqueous ethanol-N,N-dimethylformamide; M.P. 222.5–225° C. (with decomposition).

A solution of 2.8 g. of the acid obtained above in 25 ml. of ethanol is farmed on a steam bath, treated with 10 ml. of 1 N sodium hydroxide, and the resulting mixture is evaporated to dryness to give the sodium salt of N-(2-methylbenzo[B]thien-3-yl)anthranilic acid. The potassium salt is obtened in a similar manner by substituting 10 ml. of 1 N potassium hydroxide for the sodium hydroxide.

EXAMPLE 2

To a solution of 4.0 g. of N-(benzo[B]thien-2-yl)anthranilic acid in 800 ml. of chloroform cooled to 0° C. is added 2.37 g. of bromine. The resulting mixture is allowed to warm to 15° C. over a period of one hour, and is then evaporated under reduced pressure to give N-(2-bromobenzo[B]thien - 3 - yl)anthranilic acid, M.P. 209° C. (with decomposition), following crystallization from N,N-dimethylformamide and washing of the crystallized solid with ether.

The sodium salt of N-(2-bromobenzo[B]thien-3-yl)anthranilic acid is prepared by treating a solution of 3.48 g. of the above free acid in 10 ml. of ethanol with 10 ml. of 1 N sodium hydroxide and evaporating the resulting mixture to dryness under reduced pressure.

A mixture consisting of 1.4 g. of choline chloride, 3.7 g. of the sodium salt of N-(2-bromobenzo[B]thien-3-yl)-anthranilic acid, and 60 ml. of methanol is heated to about 60° C. for 10–15 minutes. The sodium chloride that forms is removed by filtration, and the filtrate is evaporated under reduced pressure to give the choline salt of N-(2-bromobenzo[B]thien-3-yl)anthranilic acid.

The N-(benzo[B]thien-3-yl)anthranilic acid, M.P. 202–204° C., following successive crystallizations from ethanol and benzene, required above as starting material, is prepared by reacting 35.0 g. of potassium anthranilate with 28.0 g. of 3-bromothianaphthene in the presence of 2.5 g. of cupric bromide and 16.4 ml. of N-ethylmorpholine in 50 ml. of N,N-dimethylformamide, utilizing the procedure described in Example 1 above for the preparation of N-(2-methylbenzo[B]thien-3-yl)anthranilic acid.

EXAMPLE 3

A mixture consisting of 3.9 g. of N-(benzo[B]-thien-3-yl)anthranilic acid, 1.96 g. of sulfuryl chloride, and 40 ml. of acetic acid is heated under reflux for one hour, cooled, diluted with an equal volume of water, and extracted with ether. The ether extract is evaporated, and the solid residue is mixed thoroughly with 5% aqueous sodium hydroxide. The alkaline mixture is filtered through diatomaceous silica (Standard Super-Cel), and the filtrate is extracted with ether and acidified to precipitate N-(2-chlorobenzo[B]thien-3-yl)anthranilic acid, which is isolated by filtration and dried; M.P. 221–223° C. (with decomposition).

A solution of 1.5 g. of ammonia in 10 ml. of ethanol is added to a hot solution of 3.0 g. of N-(2-chlorobenzo[B]thien-3-yl)anthranilic acid in 25 ml. of ethanol, and the resulting mixture is evaporated to dryness to give N-(2-chlorobenzo[B]thien-3-yl)anthranilic acid ammonium salt as a white solid. The diethylamine salt is prepared similarly by substituting 2.0 g. of diethylamine for the ammonia.

EXAMPLE 4

A mixture consisting of 14.2 g. of N-(2-methylbenzo[B]thien-3-yl)anthranilic acid, 100 ml. of absolute ethanol, and 5 ml. of concentrated sulfuric acid is heated under reflux for 18 hours. Upon cooling, the solution is diluted with 250 ml. of water, made basic with aqueous sodium carbonate, and the basic mixture is extracted with ether. The ether extract is washed well with water, dried, and evaporated under reduced pressure to give ethyl N-(2-methylbenzo[B]thien-3-yl)anthranilate.

In the foregoing procedure, with the substitution of 15.2 g. of N-(2-chlorobenzo[B]thien-3-yl)anthranilic acid for the N-(2-methylbenzo[B]thien-3-yl)anthranilic acid and 100 ml. of methanol for the ethanol, there is obtained methyl N-(2-chlorobenzo[B]thien-3-yl)anthranilate.

EXAMPLE 5

To a stirred solution of 2.83 g. of N-(2-methylbenzo[B]thien-3-yl)anthranilic acid in 40 ml. of diethyl ether, kept at about 15° C., is added dropwise a solution of diazomethane in ether (20% by weight) until a yellow color persists and vigorous foaming stops. The resulting solution is kept at room temperature overnight, washed well with saturated aqueous sodium bicarbonate, dried, and evaporated under reduced pressure to give a residue of methyl N-(2-methylbenzo[B]thien-3-yl)anthranilate.

EXAMPLE 6

A mixture consisting of 3.48 g. of N-(2-bromobenzo[B]thien-3-yl)anthranilic acid, 1.4 g. of methyl iodide, 1.4 g. of potassium carbonate, and 100 ml. of N,N-dimethylformamide is heated at 60° C. for 2 hours, cooled, and diluted with an equal volume of water. The aqueous mixture is extracted well with ether, and the ether extract is dried and evaporated to give methyl N-(2-bromobenzo[B]thien-3-yl)anthranilate.

In the foregoing procedure, with the substitution of 1.56 g. of ethyl iodide for the methyl iodide, there is obtained ethyl N-(2-bromobenzo[B]thien-3-yl)anthranilate.

EXAMPLE 7

A mixture consisting of 30.3 g. of N-(2-chlorobenzo[B]thien-3-yl)anthranilic acid, 14.4 g. of 2-dimethylaminoethyl chloride hydrochloride, 20.3 g. of triethylamine, and 125 ml. of N,N-dimethylformamide is heated at 100° C. for 24 hours, cooled, and diluted with 250 ml. of ether. The resulting mixture is filtered, and the filtrate is extracted thoroughly with dilute hydrochloric acid. The acidic extract is made alkaline with solid sodium carbonate, and the alkaline solution is extracted with ether. The ether extract is washed with water, dried, and evaporated to give 2-dimethylaminoethyl N-(2-chlorobenzo[B]thien-3-yl)anthranilate. The hydrochloride salt of this ester can be obtained by treating the ethereal solution of the basic ester with an excess of dry hydrogen chloride and isolating and drying the salt that precipitates.

In a similar manner, from the reaction of 28.3 g. of N-(2-methylbenzo[B]thien-3-yl)anthranilic acid and 18.6 g. of 3-diethylaminopropyl chloride hydrochloride there is obtained 3-diethylaminopropyl N-(2-methylbenzo[B]thien-3-yl)anthranilate and the hydrochloride salt thereof.

EXAMPLE 8

A mixture consisting of 19.1 g. of the acid chloride of N-(2-bromobenzo[B]thien-3-yl)anthranilic acid, 13.8 g. of 2-pyrrolidinoethanol, and 150 ml. of benzene is kept at room temperature overnight and then diluted with 150 ml. of ether. The ethereal mixture is washed with 0.5 N aqueous sodium hydroxide and with saturated aqueous sodium chloride, dried, and evaporated to give a residue of the 2-pyrrolidinoethyl ester of N-(2-bromobenzo[B]thien-3 - yl)anthranilic acid. The hydrochloride salt is obtained by dissolving the free base ester in ether and treating the solution with one equivalent of hydrogen chloride.

The acid chloride of N-(2-bromobenzo[B]thien-3-yl)anthranilic acid used as a starting material above is prepared as follows. A mixture of 17.4 g. of N-(2-bromobenzo[B]thien-3-yl)anthranilic acid and 75 ml. of thionyl chloride is heated under reflux for two hours and then concentrated to remove excess thionyl chloride. Benzene (200 ml.) is added to the residue, and the benzene solution is evaporated under reduced pressure to give the desired acid chloride, suitable for use without further purification.

I claim:

1. A member of the class consisting of N-benzo[B]thien-3-ylanthranilic acid compounds having the formula

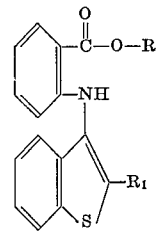

and pharmaceutically-acceptable salts thereof; where R is a member of the class consisting of hydrogen, lower alkyl, and an aminoalkyl radical having the formula

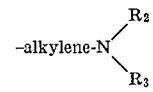

wherein the alkylene group contains not more than four carbon atoms, separating the groups to which it is attached by at least two carbon atoms, and $R_2$ and $R_3$ are chosen from the class consisting of lower alkyl radicals having not more than four carbon atoms and a further member wherein $R_2$ and $R_3$ are combined and together with the nitrogen atom to which they are attached represent pyrrolidino; and $R_1$ is a member of the class consisting of methyl, chlorine, and bromine.

2. A compound according to claim 1 wherein R is hydrogen.

3. A compound according to claim 1 which is N-(2-methylbenzo[B]thien-3-yl)anthranilic acid.

4. A compound according to claim 1 which is N-(2-chlorobenzo[B]thien-3-yl)anthranilic acid.

5. A compound according to claim 1 which is N-(2-bromobenzo[B]thien-3-yl)anthranilic acid.

References Cited

Allais et al., Chem. Abstracts 65:12166–7, October 1966.

NORMA S. MILESTONE, Primary Examiner

C. M. SHURKO, Assistant Examiner

U.S. Cl. X.R.

260—247.1, 293.4, 326.3, 999